United States Patent
Hammarwall et al.

(10) Patent No.: US 9,609,637 B2
(45) Date of Patent: Mar. 28, 2017

(54) OVERRIDE OF MULTI-TTI SCHEDULING MESSAGES

(71) Applicant: Telefonaktiebolaget L M Ericsson (publ), Stockholm (SE)

(72) Inventors: David Hammarwall, Vallentuna (SE); Daniel Larsson, Vallentuna (SE); Muhammad Imadur Rahman, Sollentuna (SE); Xinghua Song, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 196 days.

(21) Appl. No.: 14/004,921

(22) PCT Filed: Jan. 18, 2013

(86) PCT No.: PCT/SE2013/050031
§ 371 (c)(1),
(2) Date: Sep. 13, 2013

(87) PCT Pub. No.: WO2014/098701
PCT Pub. Date: Jun. 26, 2014

(65) Prior Publication Data
US 2014/0177487 A1 Jun. 26, 2014

Related U.S. Application Data

(60) Provisional application No. 61/740,477, filed on Dec. 21, 2012.

(51) Int. Cl.
*H04J 3/00* (2006.01)
*H04W 72/04* (2009.01)
*H04W 72/12* (2009.01)

(52) U.S. Cl.
CPC ..... *H04W 72/042* (2013.01); *H04W 72/1289* (2013.01)

(58) Field of Classification Search
CPC .................................................. H04W 72/042
(Continued)

(56) References Cited

U.S. PATENT DOCUMENTS 7,447,181 B1 * 11/2008 Forssell ............... H04M 15/00 370/336
8,432,864 B1 * 4/2013 Martin .............. H04W 72/0406 370/329

(Continued)

OTHER PUBLICATIONS

Nokia, et al., "LTE TDD Control Signalling for Uplink Multi-TTI Scheduling", 3GPP TSG RAN WG1 Meeting #51bis, Sevilla, Spain, Jan. 14, 2008, pp. 1-4, R1-080305, 3GPP.

(Continued)

*Primary Examiner* — Wei Zhao
*Assistant Examiner* — Abdeltif Ajid
(74) *Attorney, Agent, or Firm* — Coats & Bennett, PLLC

(57) ABSTRACT

The embodiments herein relate to a method in a network node (301) for handling scheduling of a wireless device (305) in a communications network (300). The network node (301) is adapted to communicate wirelessly with the wireless device (305) over a radio channel (310). The network node (301) determines that a data transmission or data reception corresponding to a multi-TTI scheduling message previously transmitted to the wireless device (305) should be at least one of adjusted, interrupted and terminated. The network node (301) transmits, to the wireless device (305), information indicating that the data transmission or data reception corresponding to a previously transmitted multi-Transmission Time Interval, TTI, scheduling message should be at least one of adjusted, interrupted and terminated as determined.

38 Claims, 10 Drawing Sheets

(58) Field of Classification Search
USPC .................................................. 370/280, 336
See application file for complete search history.

(56) References Cited

U.S. PATENT DOCUMENTS

| 2010/0157895 A1* | 6/2010 | Pani ................... H04W 52/346 |
| | | 370/328 |
| 2010/0235705 A1* | 9/2010 | Kim ..................... H04L 1/1671 |
| | | 714/749 |
| 2011/0176435 A1* | 7/2011 | Khandekar ............... H04L 5/16 |
| | | 370/252 |

OTHER PUBLICATIONS

Nokia, et al., "Way forward for LTE TDD Uplink Multi-TTI Scheduling", 3GPP TSG RAN WG1 Meeting #51bis, Sevilla, Spain, Jan. 14, 2008, pp. 1-6, R1-080306, 3GPP.

Sasitaival, R., et al., "LTE coverage improvement by TTI bundling", IEEE 69th Vehicular Technology Conference, Apr. 26, 2009, pp. 1-5, IEEE, Barcelona, Spain.

* cited by examiner

Fig. 1 The LTE downlink physical resource

Fig. 2 LTE time-domain structure

OVERRIDE OF MULTI-TTI SCHEDULING MESSAGES

TECHNICAL FIELD

Embodiments herein relate generally to a network node, a method in the network node, a wireless device and a method in the wireless device. More particularly the embodiments herein relate to handling scheduling of the wireless device in the communications network.

BACKGROUND

In a typical communications network, also referred to as e.g. a wireless communications network, a wireless communications system, a communications network or a communications system, a wireless device communicates via a Radio Access Network (RAN) to one or more Core Networks (CNs).

The wireless device may be a device by which a subscriber may access services offered by an operator's network and services outside the operator's network to which the operator's radio access network and core network provide access, e.g. access to the Internet. The wireless device may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device or any type of consumer electronic, for instance but not limited to television, radio, lighting arrangements, tablet computer, laptop or Personal Computer (PC). The wireless device may be portable, pocket storable, hand held, computer comprised or vehicle mounted devices, enabled to communicate voice and/or data, via the radio access network, with another entity, such as another wireless device or a server.

The wireless devices are enabled to communicate wirelessly in the communications network. The communication may be performed e.g. between two wireless devices, between a wireless devices and a regular telephone and/or between the wireless devices and a server via the radio access network and possibly one or more core networks and possibly the Internet.

The radio access network covers a geographical area which is divided into cell areas. Each cell area is served by a Base Station (BS). In some radio access networks, the base station is also called Radio Base station (RBS) evolved NodeB (eNB), NodeB or B node. A cell is a geographical area where radio coverage is provided by the base station at a base station site. The base station communicates over the air interface operating on radio frequencies with the wireless device(s) within range of the base station.

LTE Background

LTE is short for Long Term Evolution and is a technology which uses Orthogonal Frequency Division Multiplexing (OFDM) in the DownLink (DL) and Discrete Fourier Transform (DFT)-spread OFDM in the UpLink (UL). Downlink is communication down from the base station to the wireless device and uplink is communication up from the wireless device to the base station. OFDM is a method of encoding digital data on multiple carrier frequencies and used in LTE to schedule resources in both frequency and time domain. DFT-spread OFDM, also referred to as DFTS-OFDM, is a transmission scheme that may combine the desired properties for uplink transmission, i.e.:

- Small variations in the instantaneous power of the transmitted signal.
- Possibility for low-complexity high-quality equalization in the frequency domain.
- Possibility for Frequency Division Multiple Access (FDMA) with flexible bandwidth assignment.

Due to these properties, DFT-spread OFDM has been selected as the uplink transmission scheme for LTE.

The basic LTE physical resource may thus be seen as a time-frequency grid as illustrated in FIG. 1, where each resource element 101 corresponds to one subcarrier during one OFDM symbol interval on a particular antenna port. The resource element is the smallest unit within OFDM, which is one OFDM symbol transferred on one carrier. An antenna port is defined such that the channel over which a symbol on the antenna port is conveyed may be inferred from the channel over which another symbol on the same antenna port is conveyed. There is one resource grid per antenna port. The carrier spacing is 15 kHz, and is used for broadcast and multicast.

In the time domain, LTE downlink transmissions are organized into radio frames of 10 ms. Each radio frame comprises ten equally-sized subframes of 1 ms as illustrated in FIG. 2. A subframe is divided into two slots, each of 0.5 ms time duration.

The resource allocation in LTE is described in terms of resource blocks. A resource block corresponds to one slot in the time domain and twelve contiguous 15 kHz subcarriers in the frequency domain. Two in time consecutive resource blocks represent a resource block pair and corresponds to the highest granularity time interval upon which scheduling operates.

Scheduling is a mechanism where a wireless device requests a network node for the resource allocation during each Transmission Time Interval (TTI). If a wireless device has some data that it needs to transmit continuously, it will request the network node e.g. every TTI, for the resource allocation. This scheduling type may be referred to as dynamic scheduling. The advantage of dynamic scheduling is flexibility and diversity of resource allocation. Using other words, scheduling refers to selection of which wireless device(s) is/are to use the radio resources at each TTI, where one TTI is e.g. 2 ms. Scheduling of resources may also be referred to as allocation of resources.

To allow the wireless device to request uplink-transmission resources from the network node, LTE provides a Scheduling Request (SR) mechanism. The scheduling request conveys a single bit of information, indicating that the wireless device has data to transmit to the network node.

The scheduling mechanism may be implemented by a scheduler in the network node and assigns the time and frequency resources among wireless devices. A Resource Block (RB) is the smallest element that may be assigned by the scheduler. A downlink physical resource is represented as a time-frequency resource grid consisting of multiple resource blocks. A resource block is divided in multiple Resource Elements (RE). The scheduler may base its assignment decision on Quality of Service (QoS) information provided by e.g. the wireless device, queuing delay of the data to be transmitted, channel conditions etc.

There may be uplink scheduling and downlink scheduling:

Downlink scheduling: In downlink scheduling, the network node receives Channel Quality Indicator (CQI) reports from all wireless devices in its associated cell. The CQI is based on channel measurements performed by each wireless device. The network node allocates the radio resources to each wireless device in the form of downlink scheduling allocations. The scheduling is done in units of resource blocks or resource block groups.

Unlink scheduling: In uplink scheduling, the network node evaluates within each uplink TTI, which wireless devices require uplink resources, and if possible how much data each wireless device has/needs to send. Unlike in the downlink scheduling, this information is not directly available at the network node. Instead, it is reported by the wireless device using a scheduling request or a buffer status report. As with downlink scheduling, the scheduler determines how many and which resource blocks to allocate to a wireless device for an uplink grant.

Because LTE is based on OFDM, it is possible to distribute available transmission resources in the frequency domain to different wireless devices. This allocation may be changed dynamically once per subframe, that is once per millisecond. The Media Access Control (MAC) scheduler in the network node is in charge of assigning and scheduling both uplink and downlink radio resources for different wireless devices and their services. The scheduling decision covers not only the resource block assignment but also which modulation and coding scheme to use and whether or not to apply Multiple Input Multiple Output (MIMO) or beam forming.

Transmissions in LTE are dynamically scheduled in each subframe where the base station transmits downlink assignments and/or uplink grants to certain wireless devices, e.g. user equipments, via the physical downlink control information, i.e. Physical Downlink Control CHannel (PDCCH) and evolved PDCCH (ePDCCH). The PDCCHs are transmitted in the first OFDM symbol(s) in each subframe and spans more or less the whole system bandwidth. A wireless device that has decoded a downlink assignment, carried by a PDCCH, knows which resource elements in the subframe that comprises data aimed for the wireless device. A downlink assignment is an assignment of an allocated radio resource to the wireless device. Similarly, upon receiving an uplink grant, the wireless device knows which time/frequency resources it should transmit upon. In LTE downlink, data is carried by the Physical Downlink Shared data CHannel (PDSCH) and in the uplink the corresponding link is referred to as the Physical Uplink Shared CHannel (PUSCH).

Defining the enhanced downlink control signalling, e.g. ePDCCH, is an on-going project in the Third Generation Partnership Project (3GPP). However, it is likely that such control signalling may have similar functionalities as PDCCH, with the fundamental difference of requiring wireless device specific DeModulation Reference Signal (DMRS) instead of Cell-specific Reference Signals (CRS) for its demodulation. One advantage is that wireless device specific spatial processing may be exploited for ePDCCH. DMRS is a physical signal used for coherent demodulation of uplink data and control signalling. CRS is used for both demodulation and measurement purposes.

Multi-TTI Scheduling

As to reduce the scheduling assignment and/or grant overhead one feature being discussed for inclusion in Release 12 of LTE is multi-TTI scheduling. The TTI in LTE is 1 ms, which corresponds to one subframe. A multi-TTI scheduling assignment and/or grant indicates to a wireless device that the wireless device is to receive or transmit data involving multiple TTIs. This should not be confused with Semi Persistent Scheduling (SPS), which primarily is used to effectively support low rate streaming services, such as voice calls. Semi persistent scheduling is a semi-static allocation, configured by means of Radio Resource Control (RRC) messages. In case of semi persistent scheduling, the network node may assign a predefined chunk of radio resources for Voice over Internet Protocol (VoIP) wireless devices with an interval of 20 ms. Therefore, the wireless device is not required to request resources each TTI, saving control plane overhead. This scheduling is semi-persistent in the sense that network node may change the resource allocation type or location if it is required for link adaptation or for other factors. In the following, the term multi-TTI scheduling message is used to refer to both the multi-TTI scheduling assignment and the multi-TTI assignment grant.

On the contrary, multi-TTI scheduling is envisioned as a dynamic assignment that is dynamically indicated in the Downlink scheduling Control Information (DCI) format, including information of the resource block assignment in frequency. Hence, multi-TTI scheduling is operating at a much denser time granularity than SPS, and provides substantially increased flexibility to change the resource allocation in frequency. A DCI comprises uplink or downlink resource allocation. The PDCCH carries the resource assignment for wireless devices which are contained in a DCI message.

Scheduling Restrictions

An essential aspect of base station implementation is to minimize the constraints imposed on the allowable scheduling. In particular, the data traffic is dynamic by nature and may change on a very short time-scale. In particular, scheduling assignments and/or grants involving multiple subframes constrains the base station scheduling behavior in the upcoming subframes. For example, if new data reaches the base station, it may not be able to transmit this data until previous scheduling commitments are fulfilled. Such constraints introduce additional delays in the link, which may be very detrimental for delay sensitive traffic. Scheduling constraints for uplink transmissions similarly degrades the performance and latency of the communications network. Scheduling restrictions inherently degrades the communications network's adaptability for changes in the radio environment and traffic load.

Scheduling messages involving multiple TTIs, i.e. subframes, has the advantage of reduced scheduling message signaling overhead, but comes at the cost of reduced dynamic scheduling flexibility.

The existing solutions for multi-TTI scheduling cause base station scheduling restrictions that degrade the systems performance and adaptability to changes in the radio environment and traffic load/buffer levels.

SUMMARY

An object of embodiments herein is therefore to provide improved handling of scheduling the wireless device in the communications network.

According to a first aspect, the object is achieved by a method in a network node for handling scheduling of a wireless device in a communications network. The network node is adapted to communicate wirelessly with the wireless device over a radio channel. The network node determines that a data transmission or data reception corresponding to a multi-TTI scheduling message previously transmitted to the wireless device should be at least one of adjusted, interrupted and terminated. The network node transmits, to the wireless device, information indicating that the data transmission or data reception corresponding to the previously transmitted multi-TTI scheduling message should be at least one of adjusted, interrupted and terminated as determined.

According to a second aspect, the object is achieved by a method in a wireless device for handling scheduling of the wireless device in a communications network. The wireless device is adapted to communicate wirelessly with the network node over a radio channel. The wireless device receives, from the network node, information indicating that a data transmission or data reception corresponding to a previously received multi-TTI scheduling message is at least one of adjusted, interrupted and terminated. The wireless device handles the information indicating that the data transmission or data reception corresponding to the previously received multi-TTI scheduling message should be at least one of adjusted, interrupted and terminated.

According to a third aspect, the object is achieved by a network node for handling scheduling of a wireless device in a communications network. The network node is adapted to communicate wirelessly with the wireless device over a radio channel. The network node comprises a determining unit adapted to determine that a data transmission or data reception corresponding to a multi-TTI scheduling message previously transmitted to the wireless device should be at least one of adjusted, interrupted and terminated. The network node comprises a transmitter adapted to transmit, to the wireless device, information indicating that the data transmission or data reception corresponding to the previously transmitted multi-TTI scheduling message should be at least one of adjusted, interrupted and terminated as determined.

According to a fourth aspect, the object is achieved by a wireless device for handling scheduling of the wireless device in a communications network. The wireless device is adapted to communicate wirelessly with the network node over a radio channel. The wireless device comprises a receiver adapted to receive, from the network node, information indicating that a data transmission or data reception corresponding to a previously received multi-TTI scheduling message is at least one of adjusted, interrupted and terminated. The wireless device comprises a handling unit which is adapted to handle the information indicating that the data transmission or data reception corresponding to the previously received multi-TTI scheduling message should be at least one of adjusted, interrupted and terminated.

Since the network node is adapted to dynamically indicate to the wireless device that a data transmission or reception corresponding to a previously transmitted multi-TTI assignment is adjusted, interrupted, or prematurely terminated, improved handling of scheduling the wireless device in the communications network is provided. This allows the network node to prioritize other traffic without having to wait for a previous assignment and/or grant to complete, which can substantially reduce the latency in the communications network. With this, the benefit of the multi-TTI scheduling message, i.e. assignment and/or grant, in terms of reduced signalling overhead may be achieved, without imposing any additional scheduling constraints, since the network node has the flexibility to "change its mind".

A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1:
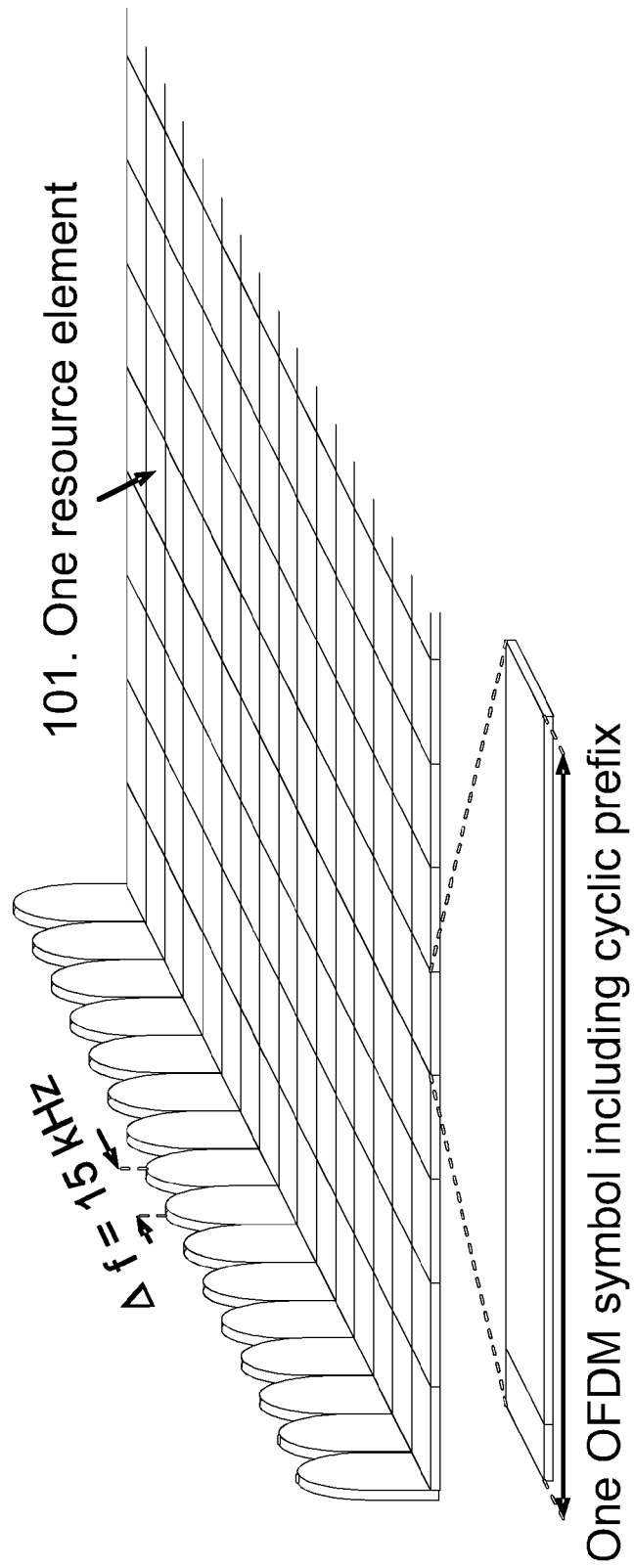
FIG. 1 is a schematic block diagram illustrating embodiments of a LTE downlink physical resource.
Figure 2:
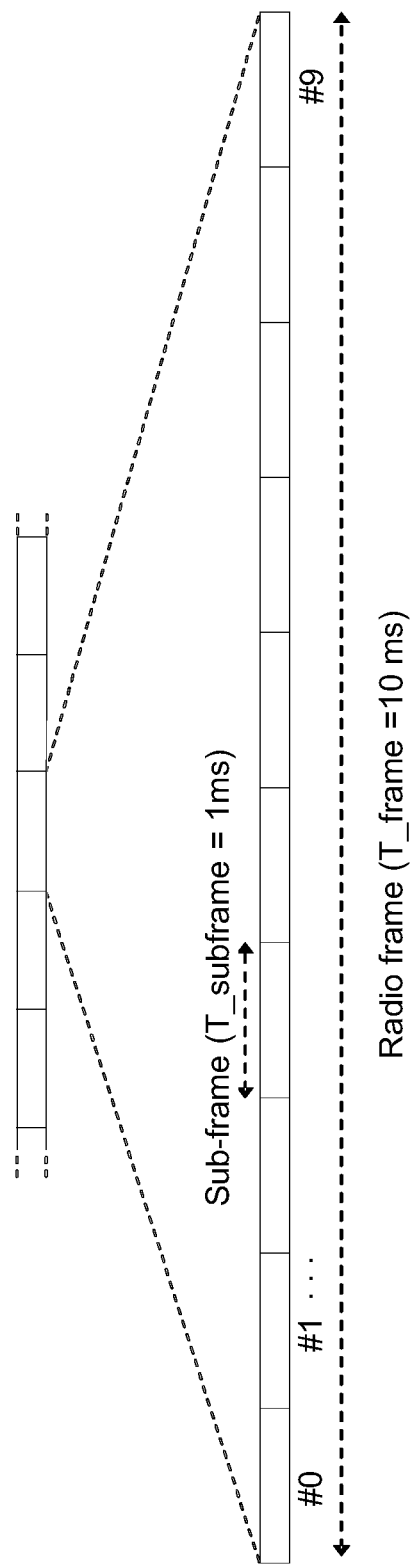
FIG. 2 is a schematic block diagram illustrating embodiments of a LTE time-domain structure.
Figure 3:
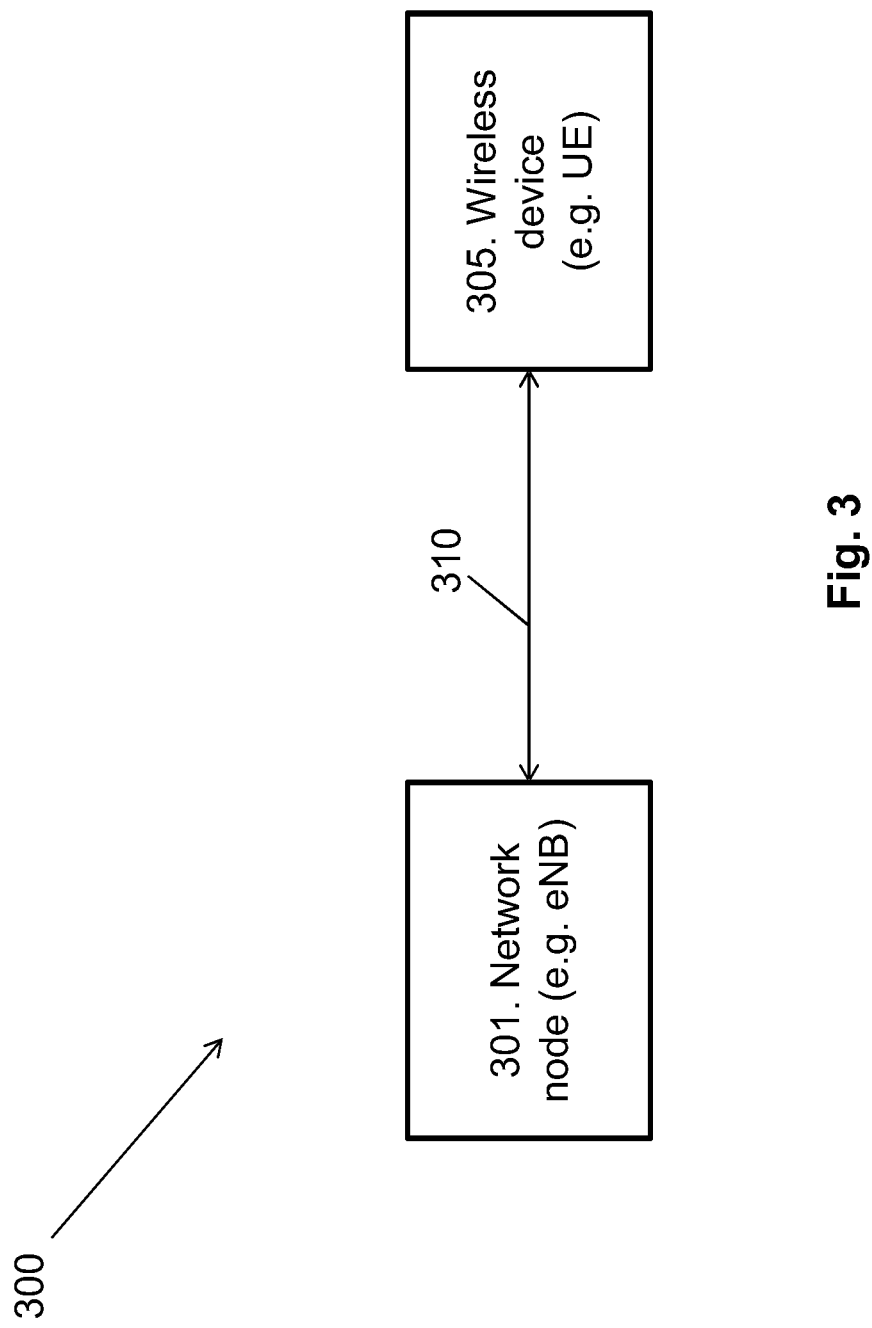
FIG. 3 is a schematic block diagram illustrating embodiments of a communications network.

FIG. 3 depicts a communications network 300 in which embodiments herein may be implemented. The communications network 300 may in some embodiments apply to one or more radio access technologies such as for example LTE, LTE Advanced, Wideband Code Division Multiple Access (WCDMA), Global System for Mobile Communications (GSM), any other 3GPP radio access technology or other radio access technologies such as Wireless Local Area Network (WLAN).

The communications network 300 comprises a network node 301. The network node 301 may be a base station, NodeB, Base Station Controller (BSC), eNodeB or any other network node capable of communicating with a wireless device 305 over a radio channel 310.

The wireless device 305 may be a device by which a subscriber may access services offered by an operator's network and services outside operator's network to which the operator's radio access network and core network provide access, e.g. access to the Internet. The wireless device 305 may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, M2M device or any type of consumer electronic, for instance but not limited to television, radio, lighting arrangements, tablet computer, laptop or PC. The wireless device 305 may be portable, pocket storable, hand held, computer comprised or vehicle mounted devices enabled to communicate voice and/or data, via the radio access network, with another entity, such as another wireless device or a server.

The method for handling scheduling of the wireless device 305 in the communications network 300 according to some embodiments will now be described with reference to the signalling diagram depicted in FIG. 4. The network node 301 is adapted to communicate wirelessly with the wireless device 305 over a radio channel 310. The communications network 300 may be a Time-Division Duplexing (TDD) network or a Frequency-Division Duplexing (FDD) network. Duplexing is the process of achieving two-way communications over a communications channel. TDD uses a single frequency band for both transmit and receive. In FDD, the transmitter and receiver operate at different carrier frequencies. The method comprises the following steps, which steps may as well be carried out in another suitable order than described below.

Step 401

The network node 301 determines a multi-TTI scheduling message for the wireless device 305. The network node 301 uses the multi-TTI scheduling message to inform the wireless device 305 about resource block assignments, modulation and coding schemes to be used. The multi-TTI scheduling message may be a multi-TTI scheduling assignment for a downlink direction or a multi-TTI scheduling grant for an uplink direction. A downlink scheduling assignment for transmission to the wireless device 305 is typically triggered by incoming data or higher layer control signaling intended for the wireless device 305. An uplink scheduling grant is typically triggered by a reception of a data transmission request received from the wireless device 305.

The scheduling may be an uplink scheduling or a downlink scheduling.

Each multi-TTI scheduling process, i.e. the process of assignment or grant, may be identified by a respective Radio Network Temporary Identity (RNTI).

Step 402

The network node 301 transmits the multi-TTI scheduling message to the wireless device 305.

The transmitted multi-TTI message may comprise information indicating a transmission and/or reception of data until further notice.

Step 403

The wireless device 305 decodes the multi-TTI scheduling message and determines whether it should transmit data to the network node 301 or whether it should receive data from the network node 305 and in which subframes the transmission or reception should take place.

Step 404

The wireless device 305 transmits data to or receives data from the network node 301.

Step 405

The network node 301 determines that data transmission or data reception corresponding to the previously transmitted multi-TTI scheduling message transmitted in step 402 should be at least one of adjusted, interrupted and terminated. This is equivalent to that the resource assignment and/or grant contained in the previously transmitted multi-TTI message should be at least one of adjusted and/or interrupted and/or terminated.

The network node 301 may determine this based on incoming data to another wireless device that should be prioritized as not to wait until a previous multi-TTI scheduling message expires, e.g. the previous multi-TTI scheduling message transmitted in step 402.

Another alternative may be that the network node 301 receives a negative acknowledgement from another wireless device, indicating that a previous data transmission was not decoded properly, then the network node 301 may have to retransmit data to another wireless device and thereby interrupt an ongoing multi-TTI scheduling assignment. Similarly in the uplink, if the network node 301 fails to decode some data from the same or another wireless device, the network node 301 may have to override an ongoing uplink multi-TTI scheduling grant, as to prioritize a retransmission.

Yet another alternative may be that the radio propagation conditions change unexpectedly, in which case a current multi-TTI scheduling message may be matched to the propagation channel or interference conditions, i.e. transmitted at a too high or low rate or at the wrong frequency sub band(s) etc.

The previously transmitted multi-TTI scheduling message may further comprises information indicating at least one of transmission of data to the network node 301 and reception of data from the network node 301 until further notice.

Step 406

The network node 301 transmits, to the wireless device 305, information indicating that data transmission or data reception corresponding to the previously transmitted multi-TTI scheduling message should be at least one of adjusted and/or interrupted and/or terminated, as determined in step 405. This is equivalent to that the resource assignment/grant contained in the previously transmitted multi-TTI message should be at least one of adjusted and/or interrupted and/or terminated. This enables the network node 301 to dynamically adapt the scheduling of the wireless device 305 without being constrained by previous multi-TTI scheduling messages.

In some embodiment, the information indicating that the data transmission or data reception corresponding to the previously transmitted multi-TTI message is interrupted or terminated is based on predefined rules of a DCI interpretation.

In some embodiments, when new data traffic enters the network node 301, the network node 301 transmits the information about the new data in a new multi-TTI scheduling message to the wireless device 305, which is to override or extend or reduce the previous transmitted multi-TTI scheduling message. The new traffic may be intended for the wireless device 305 or for another wireless device.

In some embodiments, the network node 301 transmits the information in a single-TTI scheduling message to the wireless device 305 that should override the previously transmitted multi-TTI scheduling message. A single-TTI scheduling message indicates to a wireless device that the wireless device is to receive or transmit data involving a single TTI.

Step 407

The wireless device 305 handles the information indicating that the data transmission or data reception corresponding to the previously transmitted multi-TTI scheduling message should be adjusted, and/or interrupted, and/or terminated and acts accordingly.

Step 408a

The wireless device 305 transmits new data to the network node 301 which is adjusted, and/or interrupted, and/or terminated compared to the data transmitted in step 404. This step is an alternative to step 408b, i.e. step 408b is not performed when step 408a is performed.

Step 408b

The wireless device 305 receives new data from the network node 301 which is adjusted, and/or interrupted and/or terminated compared to the data transmitted or received in step 404. This step is an alternative to step 408a, i.e. step 408a is not performed when step 408b is performed.

The embodiments herein relate to LTE, small cells, Physical Resource Block (PRB) Bundling, Precoding Resource Group (PRG), Semi Persistent Scheduling (SPS) and Multi-TTI Scheduling.

In an embodiment, the network node 301 assigns a multi-TTI scheduling based on scrambling the Cyclic Redundancy Check (CRC) for the DCI message with a specific RNTI that indicates to the wireless device 305 that this is multi-TTI scheduling message. CRC is used for the detection of errors in the transport block, i.e. the multi-TTI scheduling message by the receiver.

In a further embodiment based on the previous embodiment the wireless device 305 may be configured for several multi-TTI scheduling processes, such as e.g. assignment or grant. In an example the different multi-TTI scheduling processes are identified by different RNTI values.

In another further embodiment, the multi-TTI scheduling is enabled by MAC signalling or RRC signalling. In such embodiment, when multi-TTI scheduling is triggered, the wireless device 305 shall start trying to decode a specific DCI format carrying the multi-TTI scheduling assignment/grant information, on which the CRC is scrambled by a specific RNTI as described in the above embodiment. In one embodiment, the network node 301 may dynamically, implicitly or explicitly, indicate to a wireless device 305 that a data transmission or reception corresponding to a previous multi-TTI assignment is prematurely adjusted, interrupted or terminated. This will allow the network node 301 to prioritize other traffic without having to wait for the previous multi-TTI grants to complete, which may substantially reduce the latency in the communications network 300.

In another embodiment, some of the properties of the multi-TTI scheduling are given by the DCI message that activates the multi-TTI and some of the properties are given by MAC or RRC signalling. This may apply equally for scheduling in uplink or downlink. Example of properties given may be:
 Resource allocation.
 Modulation and Coding Scheme (MCS).
 Hybrid Automatic Repeat reQuest (HARQ) process number.
 Carrier to which it applies to.
 Cyclic shift for DMRS and Orthogonal Cover Code (OCC) index (uplink only).

For example, the HARQ process number may be given by RRC signalling while the remaining fields may be given by the DCI message.

In another embodiment, the wireless device 305 may receive a new multi-TTI assignment that overrides the previous assignment, allowing the network node 301 to prematurely adjust the assignment. This is useful if new data traffic enters the network node 301, in which case this assignment may be frequency multiplexed with the on-going multi-TTI grant. Similarly, new grants may override previous multi-TTI grants in the uplink. This may for example be done if the wireless device 305 receives a DCI message scrambled with multi-TTI related RNTI. In another embodiment, the wireless device 305 may receive an adjustment assignment and/or grant that extends or reduces the assignment/grant relative the current assignment and/or grant. For example, an indicated "1" for a Resource Block Group (RBG) flips the assignment and/or grant state of that RBG and a "0" preserves the current assignment and/or grant state. A RBG comprises several consecutive PRBs.

In another embodiment, a multi-TTI scheduling message indicates a transmission and/or reception of data "until further notice", without end. The network node 301 may dynamically adjust and terminate the allocation by the above embodiments.

In another embodiment the multi-TTI scheduling assignment may be temporarily interrupted. For example, the wireless device 305 may receive a single-TTI scheduling assignment, which overrides the multi-TTI scheduling assignment in the current subframe. The wireless device 305 may for example identify the single-TTI scheduling assignment by receiving the single TTI scheduling message with another RNTI than the multi-TTI RNTI transmitted with the multi-TTI scheduling assignment. For example, the wireless device 305 detects that the Cell-RNTI (C-RNTI) has been scrambled on to the CRC for the received DCI message. C-RNTI is a wireless device identifier allocated by a controlling Radio Network Controller (RNC) and it is unique within one cell controlled by the allocating RNC.

In one such embodiment, the wireless device 305 is to dynamically detect or receive an indication that a transmission intended for the wireless device 305 is present in a current subframe that has been indicated in a multi-TTI scheduling assignment. If a transmission is not present, the wireless device 305 shall assume that the TTI scheduling assignment is temporarily or indefinitely interrupted. If a transmission is determined to be present, the wireless device 305 proceeds to decode according to the allocation indicated in the multi-TTI assignment. In a further embodiment, when a multi-TTI scheduling assignment is temporarily interrupted, the wireless device 305 may try to decode the transport block or stop for the current subframe and try to decode the transport block until the whole transport block has been received.

In another further embodiment, the multi-TTI scheduling, i.e. the data transmission or reception corresponding to the previously transmitted multi-TTI scheduling message, may be temporarily interrupted or terminated prematurely by setting predefined rules of a specific DCI interpretation. Upon receiving the multi-TTI scheduling message which indicates an interruption or termination, the wireless device 305 will stop the multi-TTI scheduling temporarily for the current subframe or prematurely.

In one embodiment, the multi-TTI override is applied in the downlink. In another embodiment the multi-TTI override is applied in the uplink.

In further embodiment, for the uplink, the wireless device 305 interrupts the multi-TTI scheduling if the wireless device's 305 buffer is empty. In another version of the embodiment the wireless device 305 pads the transmission if the wireless device's 305 transmission buffer is empty.

In one embodiment the wireless device 305 listens to a control channel, e.g., PDCCH or ePDCCH, in subframes during the multi-TTI assignment and/or grant. In one such embodiment, if the wireless device 305 receives no new multi-TTI scheduling message it proceeds to receive and/or transmit data according to a previously received multi-TTI scheduling message. In case a new multi-TTI scheduling message is received, it overrides the previously received multi-TTI scheduling message accordingly.

In one further embodiment, the transport blocks of a multi-TTI scheduling assignment and/or grant do not span more than one subframe. This simplifies the dynamic adjustments outlined above, since this allows each subframe to be decoded independently. In another embodiment, the transport block size of a multi-TTI scheduling assignment/grant spans several subframes. The wireless device 305 may be indicated by the network node 301 on the number of subframes needed for decoding, which does not necessarily have to be the same as the number of subframes for a single multi-TTI scheduling message.

In another embodiment, the number of subframes the multi-TTI scheduling messages spans is indicated in the downlink assignment or uplink grant. In other version of the same embodiment, the length of the multi-TTI scheduling is defined by RRC signalling or MAC signalling. In another embodiment, hopping may be enabled or disabled by multi- TTI subframe scheduling. The granularity may be on subframe level or several subframes. As an example, the same resources are allocated to the wireless device 305 in all allocated/scheduled subframes when hopping is disabled. In another example, the resource allocated/scheduled to the wireless device 305 is determined by a predefined hopping pattern.

In another embodiment, the communications network 300 operates with flexible TDD, where a portion of the subframes of for example a radio frame may be defined as flexible subframes, which are either allocated for downlink or uplink based on instantaneous data traffic situations at the network node 301. In one embodiment, the multi-TTI scheduling grant may be overridden by a reconfiguration or reallocation of the uplink/downlink state of flexible subframes.

In another embodiment, when a certain flexible subframe is allocated to uplink instead of downlink, the wireless device 305 may automatically assume that the multi-TTI scheduling for that subframe is interrupted, while the wireless device 305 may receive the downlink data in the following downlink (including flexible) subframes.

In another embodiment, the downlink multi-TTI scheduling grant may be combined with flexible downlink subframe allocation, to find out the downlink transmission grants for the wireless device 305.

In another embodiment, the uplink multi-TTI scheduling grant may be combined with flexible uplink subframe allocation, to find out the uplink transmission grants for the wireless device 305.

In another embodiment, when the network node 301 changes the TDD configuration to a new uplink/downlink combination, then the multi-TTI scheduling grants may be continued unless and until an explicit message is transmitted to wireless device 305. If the new configuration is uplink heavy while the old configuration is downlink heavy, then the wireless device 305 may automatically assume that current multi-TTI scheduling grant is not valid any more.

Figure 5:
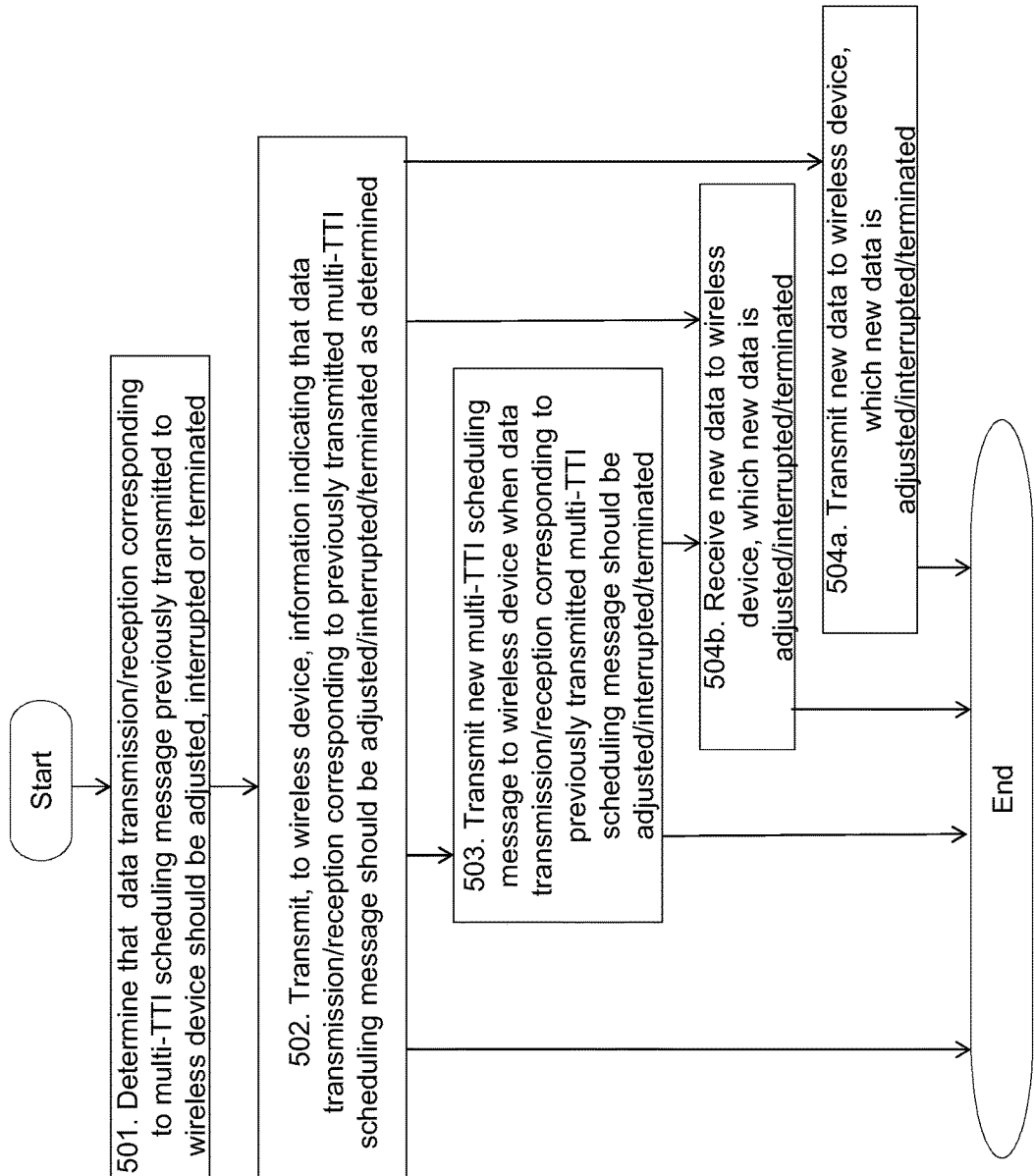
FIG. 5 is a flow chart illustrating embodiments of a method in a network node.

The method described above will now be described seen from the perspective of the network node 301. FIG. 5 is a flowchart describing the present method in the network node 301 for handling scheduling of a wireless device 305 in a communications network 300. The network node 301 is adapted to communicate wirelessly with the wireless device 305 over a radio channel 310. The wireless device 305 may be a user equipment and the network node 301 may be a base station 305. The communications network 300 may be a TDD network or a FDD network. The method comprises the following steps performed by the network node 301, which steps may be performed in any suitable order than described below:

Step 501

Figure 4:
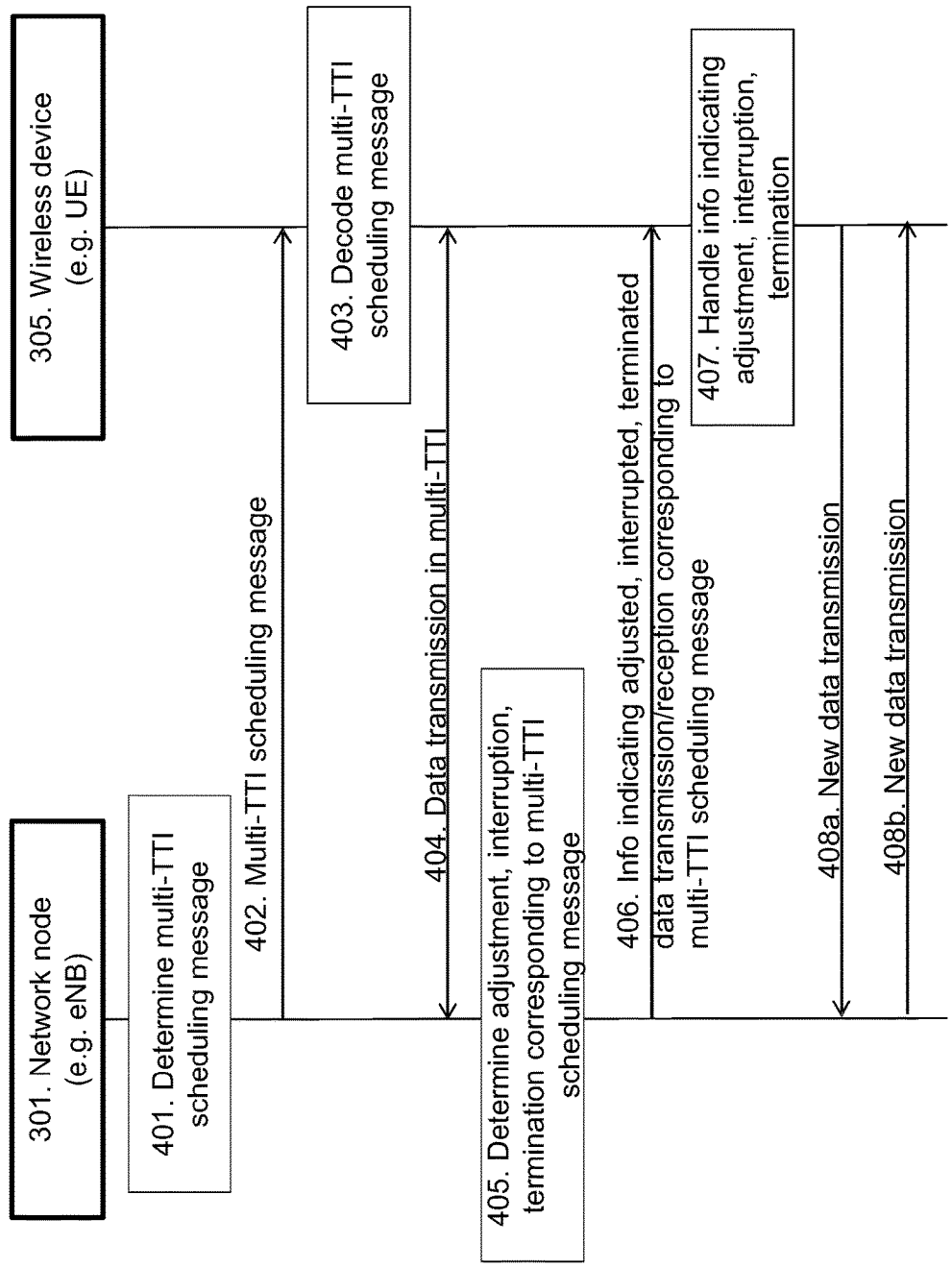
FIG. 4 is a signalling diagram illustrating embodiments of a method in the communications network.

This step corresponds to step 405 in FIG. 4.

The network node 301 determines that a data transmission or data reception corresponding to a multi-TTI scheduling message previously transmitted to the wireless device 305 should be at least one of adjusted, interrupted and terminated.

Step 502

This step corresponds to step 406 in FIG. 4.

The network node 301 transmits, to the wireless device 305, information indicating that the data transmission or data reception corresponding to the previously transmitted multi-TTI scheduling message should be at least one of adjusted, interrupted and terminated as determined in step 501.

The transmitted information may be a new multi-TTI scheduling message or a single-TTI scheduling message.

In some embodiments, the previously transmitted multi-TTI scheduling message is overridden by a reconfiguration or reallocation of an uplink state or downlink state of the flexible subframes.

Step 503

This step corresponds to step 406a in FIG. 4.

In some embodiments, the network node 301 transmits a new multi-TTI scheduling message to the wireless device 305 when the data transmission or data reception corresponding to the previously transmitted multi-TTI scheduling message should be at least one of adjusted, interrupted and terminated. The new multi-TTI scheduling message is to override or extend or reduce the previously transmitted multi-TTI scheduling message. This may be performed if the scheduling message received by the wireless device 305 is indicated with another RNTI than the multi-TII scheduling message was, for example the C-RNTI.

The multi-TTI scheduling message may be a multi-TTI scheduling assignment for a downlink direction or a multi-TTI scheduling grant for an uplink direction. The multi-TTI scheduling message is the previously transmitted multi-TTI scheduling message or a new multi-TTI scheduling message.

In some embodiments, the transmitted information is based on predefined rules of a DCI interpretation.

Step 504a

This step corresponds to step 408a in FIG. 4.

The network node 301 may transmit new data to the wireless device 305. The new data is at least one of adjusted, interrupted and terminated.

Step 504b

This step corresponds to step 408b in FIG. 4.

The network node 301 may receive new data from the wireless device 305. The new data is at least one of adjusted, interrupted and terminated.

In some embodiments, at least part of the data transmission or data reception are in flexible subframes, and wherein the subframes are flexible with regards to being an uplink or downlink subframe and based on instantaneous traffic situations at the network node 301.

Figure 6:
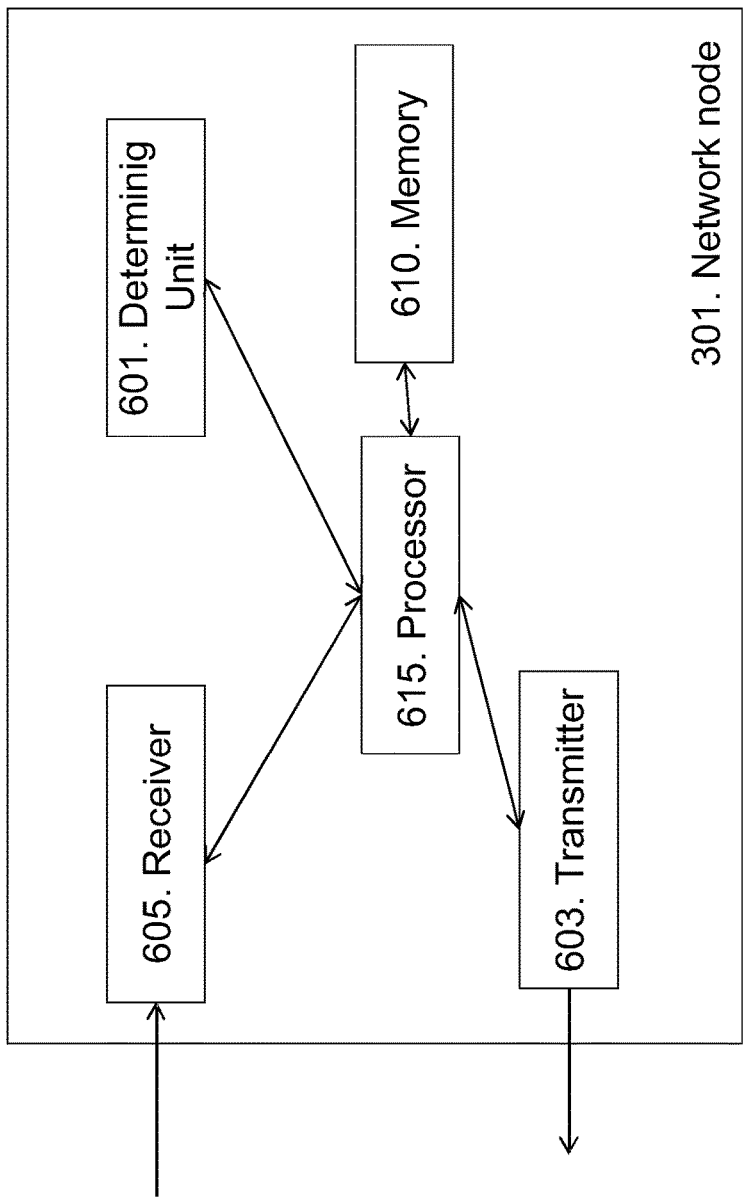
FIG. 6 is a schematic block diagram illustrating embodiments of a network node.

To perform the method steps shown in FIGS. 4 and 5 for handling scheduling of the wireless device 305 in the communications network 300, the network node 301 comprises an arrangement shown in FIG. 6. The network node 301 is adapted to communicate wirelessly with the wireless device 305 over a radio channel 310. The wireless device 305 may be a user equipment and the network node 301 may be a base station 305. The communications network 300 may be a TDD network or a FDD network.

The network node 301 comprises a determining unit 601 which is adapted to determine that a data transmission or data reception corresponding to a multi-TTI scheduling message previously transmitted to the wireless device 305 should be at least one of adjusted, interrupted and terminated.

The network node 301 comprises a transmitter 603 which is adapted to transmit, to the wireless device 305, information indicating that the data transmission or data reception corresponding to the previously transmitted multi-TTI scheduling message should be at least one of adjusted, interrupted and terminated as determined.

The transmitted information may be comprised in a new multi-TTI scheduling message or a single-TTI scheduling message.

The transmitter 603 is further adapted to transmit a new multi-TTI scheduling message to the wireless device 305 when the data transmission or data reception corresponding to the previously transmitted multi-TTI scheduling message should be at least one of adjusted, interrupted and terminated. The new multi-TTI scheduling message is to override or extend or reduce the previously transmitted multi-TTI scheduling message.

The multi-TTI scheduling message may be a multi-TTI scheduling assignment for a downlink direction or a multi-TTI scheduling grant for an uplink direction. The multi-TTI scheduling message may be the previously transmitted multi-TTI scheduling message or a new multi-TTI scheduling message.

The transmitted information may be based on predefined rules of a DCI interpretation.

The transmitter 603 is further adapted to transmit new data to the wireless device 305. The new data is at least one of adjusted, interrupted and terminated.

The network node 301 may further comprise a receiver 605 which is adapted to receive new data from the wireless device 305. The new data is at least one of adjusted, interrupted and terminated.

In some embodiments, at least part of the data transmission or data reception are in flexible subframes, and the subframes are flexible with regards to being an uplink or downlink subframe and based on instantaneous traffic situations at the network node 301.

In some embodiments, the previously transmitted multi-TTI scheduling message is overridden by a reconfiguration or reallocation of an uplink state or downlink state of the flexible subframes.

The network node 301 may further comprise a memory 610 comprising one or more memory units. The memory 610 is arranged to be used to store data, received data streams, power level measurements, threshold values, time periods, configurations, multi-TTI scheduling messages, single-TTI scheduling messages, schedulings, consecutive and non-consecutive subframes, subframe pattern, reference point, number of subframes, parameters, downlink and uplink information, TDD and FDD information, scheduling assignment/grant, and applications to perform the methods herein when being executed in the network node 301.

Those skilled in the art will also appreciate that the receiver 605, the determining unit 601 and the transmitter 603 described above may refer to a combination of analog and digital circuits, and/or one or more processors configured with software and/or firmware, e.g. stored in a memory, that when executed by the one or more processors such as the processor 615 performed as described below.

Figure 7:
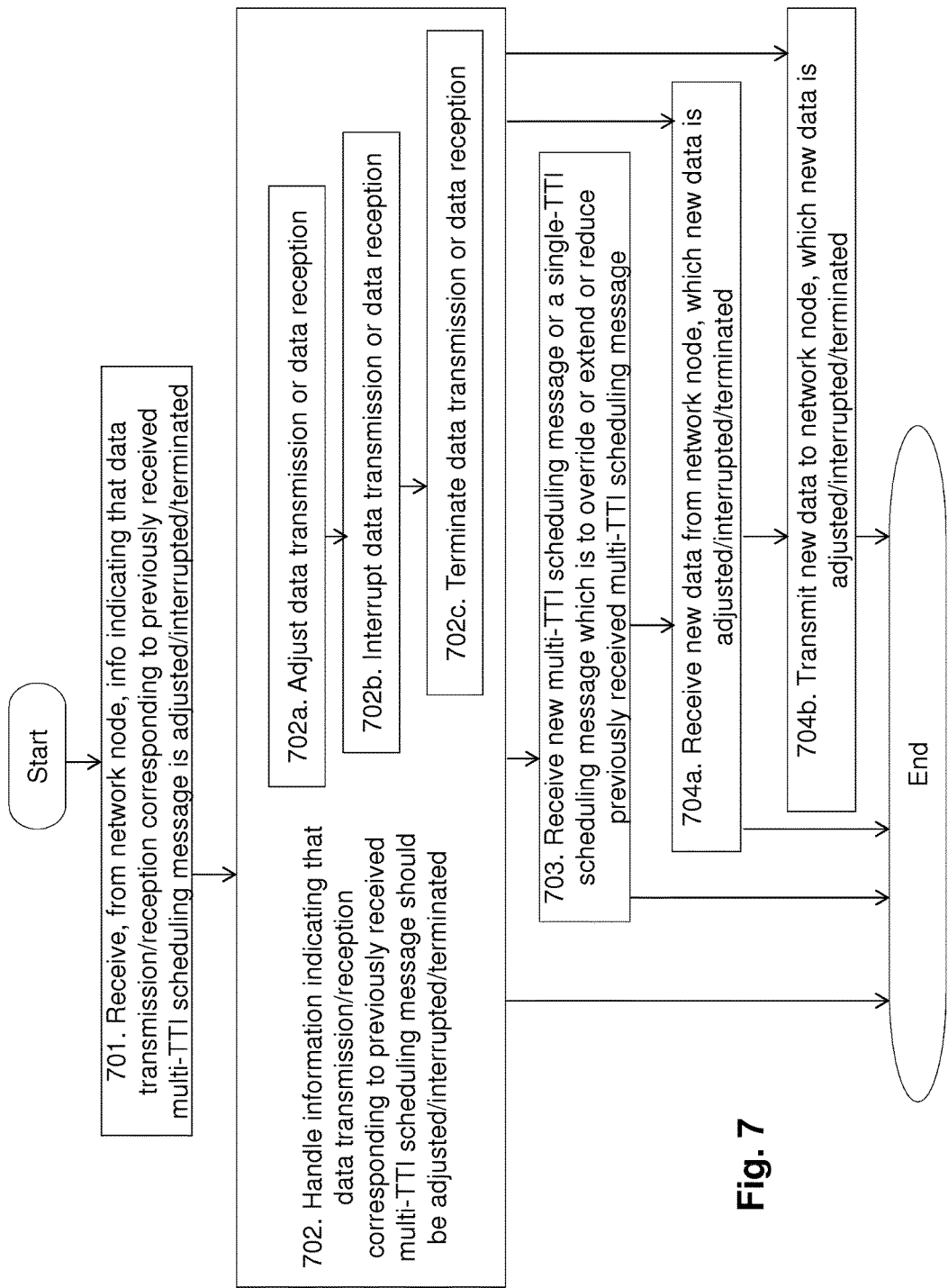
FIG. 7 is a flow chart illustrating embodiments of a method in a wireless device

The method described above will now be described seen from the perspective of the wireless device 305. FIG. 7 is a flowchart describing the present method in the wireless device 305 for handling scheduling of the wireless device 305 in a communications network 300. The wireless device 305 is adapted to communicate wirelessly with the network node 301 over a radio channel 310. The wireless device 305 may be a user equipment and the network node 301 may be a base station. The communications network 300 may be a TDD network or a FDD network. The method comprises the following steps performed by the wireless device 305, which steps may be performed in any suitable order than described below:

Step 701

This step corresponds to step 406 in FIG. 4.

The wireless device 305 receives, from the network node 301, information indicating that a data transmission or data reception corresponding to a previously received multi-TTI scheduling message is at least one of adjusted, interrupted and terminated.

The multi-TTI scheduling message may be a multi-TTI scheduling assignment or a multi-TTI scheduling grant. The multi-TTI scheduling message is the previously transmitted multi-TTI scheduling message or a new multi-TTI scheduling message. The multi-TTI scheduling message may also be referred to as a multi-TTI allocation message.

Step 702

This step corresponds to step 407 in FIG. 4.

The wireless device 305 handles the information indicating that the data transmission or data reception corresponding to the previously received multi-TTI scheduling message should be at least one of adjusted, interrupted and terminated.

Step 702*a*

In some embodiments, the wireless device 305 adjusts the data transmission or data reception.

Step 702*b*

In some embodiments, the wireless device 305 interrupts the data transmission or data reception.

In some embodiments, this step also involves determining that a buffer of the wireless device 305 is empty. The wireless device 305 interrupts the data transmission or data reception when the buffer is empty or the wireless device 305 pads the data transmission or data reception when the buffer is empty. Padding means that the transport block is appended with bogus information if there are bits left in it when the wireless device 305 is supposed to transmit it. The problem is that the wireless device 305 is assigned a certain transport block size, i.e. that it needs to transmit a certain number of information bits each multi-TII scheduling occasion. If the wireless device 305 does not have any more information to transmit it needs to append the current set of information bit is has (which may also be zero) message is appended with some bits. Typically how this would be done is that a certain number of zeros will be added to the message with an indication on how many has been added, so the network node 301 knows which bits are padding bits in the end when it receives the transport block.

Step 702*c*

In some embodiments, the wireless device 305 terminates the data transmission or data reception.

Step 703

In some embodiments, the wireless device 305 receives a new multi-TTI scheduling message or a single-TTI scheduling message which is to override or extend or reduce the previously received multi-TTI scheduling message.

Step 704*a*

In some embodiments, the wireless device 305 receives new data from the network node 301. The new data is at least one of adjusted, interrupted and terminated. This is step is an alternative to step 704*b*.

Step 704*b*

In some embodiments, the wireless device 305 transmits new data to the network node 301. The new data is at least one of adjusted, interrupted and terminated. This is step is an alternative to step 704*a*.

In some embodiments, at least part of the data transmission or data reception are in flexible subframes, and the subframes are flexible with regards to being an uplink or downlink subframe and based on instantaneous traffic situations at the network node 301.

Figure 8:
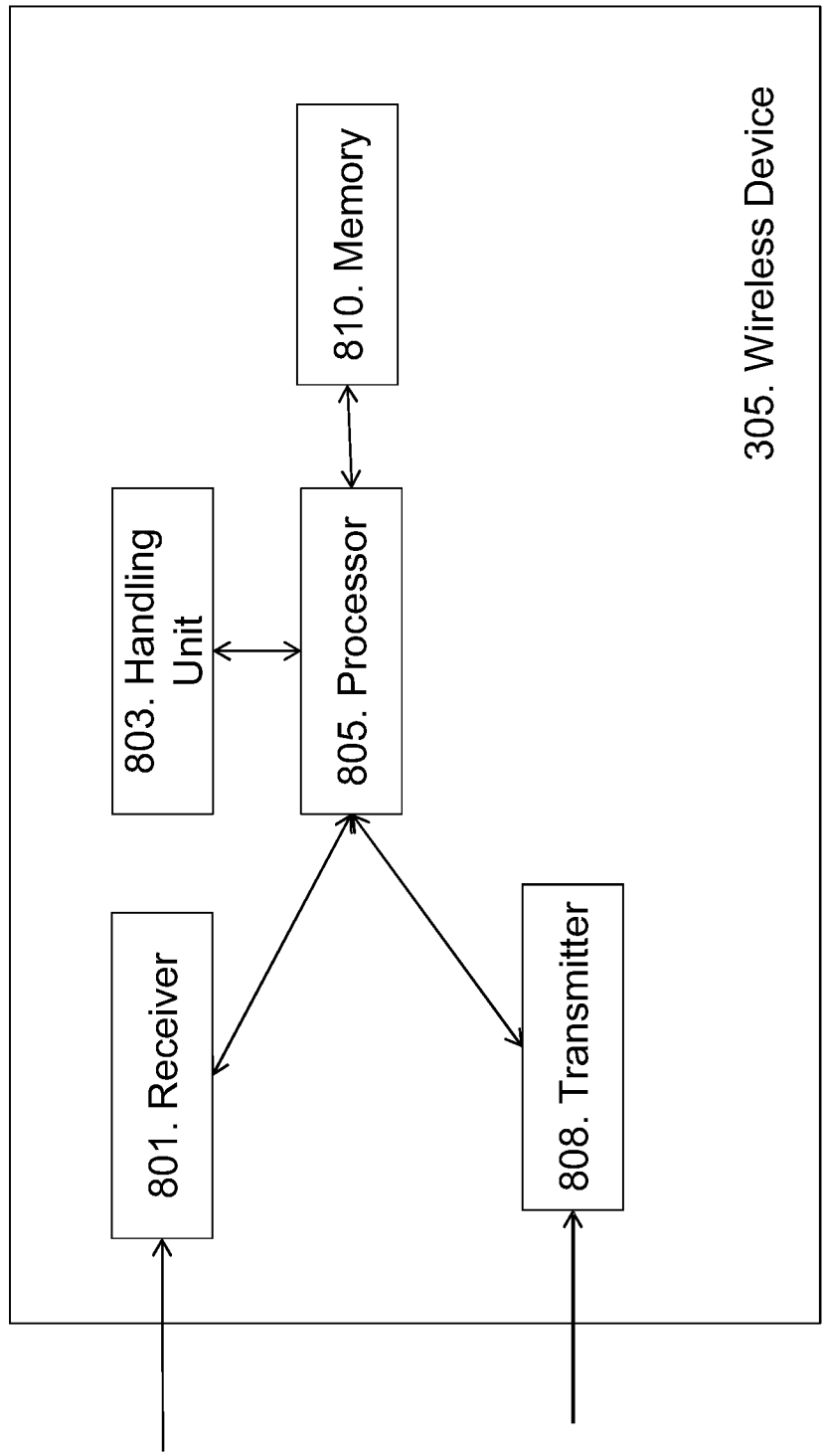
FIG. 8 is a schematic block diagram illustrating embodiments of a wireless device.

To perform the method steps shown in FIG. 7 for handling scheduling of the wireless device 305 in the communications network 300, the wireless device 305 comprises an arrangement shown in FIG. 8. The wireless device 305 is adapted to communicate wirelessly with the network node 301 over the radio channel 310. The wireless device 305 may be a user equipment and the network node 301 may be a base station. The communications network 300 is a TDD network or a FDD network.

The wireless device 305 comprises a receiver 801 which is adapted to receive, from the network node 301, information indicating that a data transmission or data reception corresponding to a previously received multi-TTI scheduling message is at least one of adjusted, interrupted and terminated. In some embodiments, the receiver 801 is further adapted to receive a new multi-TTI scheduling message or a single-TTI scheduling message which is to override or extend or reduce the previously received multi-TTI scheduling message. The receiver 801 may be is further adapted to receive new data from the network node 301. The new data may be at least one of adjusted, interrupted and terminated. The multi-TTI scheduling message may be a multi-TTI scheduling assignment or a multi-TTI scheduling grant. The multi-TTI scheduling message may be the previously transmitted multi-TTI scheduling message or a new multi-TTI scheduling message.

The wireless device 305 comprises a handling unit 803 which is adapted to handle the information indicating that the data transmission or data reception corresponding to the previously received multi-TTI scheduling message should be at least one of adjusted, interrupted and terminated. In some embodiments, the handling unit 803 is further adapted to adjust the data transmission or data reception, interrupt the data transmission or data reception and terminate the data transmission or data reception. In some embodiments, the handling unit 803 is adapted to interrupt the data transmission or data reception when the buffer is empty and to pad the data transmission or data reception when the buffer is empty.

In some embodiments, the wireless device 305 comprises a processor 805 which is adapted to determine that a buffer of the wireless device 305 is empty.

In some embodiments, the wireless device 305 comprises a transmitter 808 which is adapted to transmit new data to the network node 301. The new data may be at least one of adjusted, interrupted and terminated.

The at least part of the data transmission or data reception may be in flexible subframes, and the subframes may be flexible with regards to being an uplink or downlink subframe and based on instantaneous traffic situations at the network node 301.

The wireless device 305 may further comprise a memory 810 comprising one or more memory units. The memory 810 is arranged to be used to store data, received data streams, power level measurements, threshold values, time periods, configurations, TTIs, schedulings, consecutive and non-consecutive subframes, subframe pattern, reference point, number of subframes, parameters, downlink and uplink information, TDD and FDD information, scheduling assignment/grant, and applications to perform the methods herein when being executed in the network node 301.

Those skilled in the art will also appreciate that the receiver 801, the handling unit 803 and the transmitter 808 described above may refer to a combination of analog and digital circuits, and/or one or more processors configured with software and/or firmware, e.g. stored in a memory, that when executed by the one or more processors such as the processor 805 performing as described below.

The present mechanism for scheduling the wireless device 301 may be implemented through one or more processors, such as the processor 615 in the network node arrangement depicted in FIG. 6 and the processor 805 in the wireless device arrangement depicted in FIG. 8, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the network node 301 and/or wireless device 305. One such carrier may be in the form of a CD ROM disc. It is however feasible with other data carriers such as a memory stick. The computer program code may furthermore be provided as pure program code on a server and downloaded to the network node 301 and/or wireless device 305.

Figure 9:
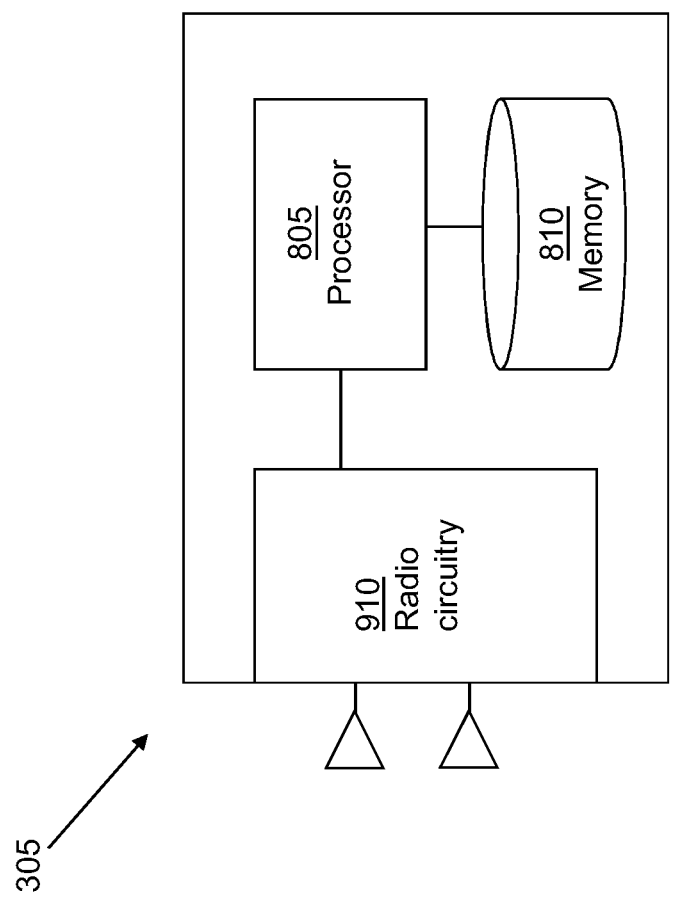
FIG. 9 is a schematic block diagram illustrating embodiments of a wireless device.

The example communications network in FIG. 3 may further comprise any additional elements suitable to support communication between wireless devices or between a wireless device and another communication device, such as a landline telephone. Although the illustrated wireless device 305 may represent a communication device that comprises any suitable combination of hardware and/or software, this wireless device may, in particular embodiments, represent a device such as the example wireless device 301 illustrated in greater detail by FIG. 9. Similarly, although the illustrated network nodes may represent network nodes that comprises any suitable combination of hardware and/or software, these network nodes may, in particular embodiments, represent devices such as the example network node 301 illustrated in greater detail by FIG. 10.

As shown in FIG. 8, the example wireless device 305 comprises the processor 805, the memory 810, radio circuitry 910, and at least one antenna. The radio circuitry 910 may comprise RF circuitry and baseband processing circuitry (not shown). In particular embodiments, some or all of the functionality described above as being provided by mobile communication devices or other forms of wireless device may be provided by the processor 805 executing instructions stored on a computer-readable medium, such as the memory 810 shown in FIG. 9. Alternative embodiments of the wireless device 305 may comprise additional components beyond those shown in FIG. 9 that may be responsible for providing certain aspects of the wireless device's functionality, comprising any of the functionality described above and/or any functionality necessary to support the solution described above.

Figure 10:
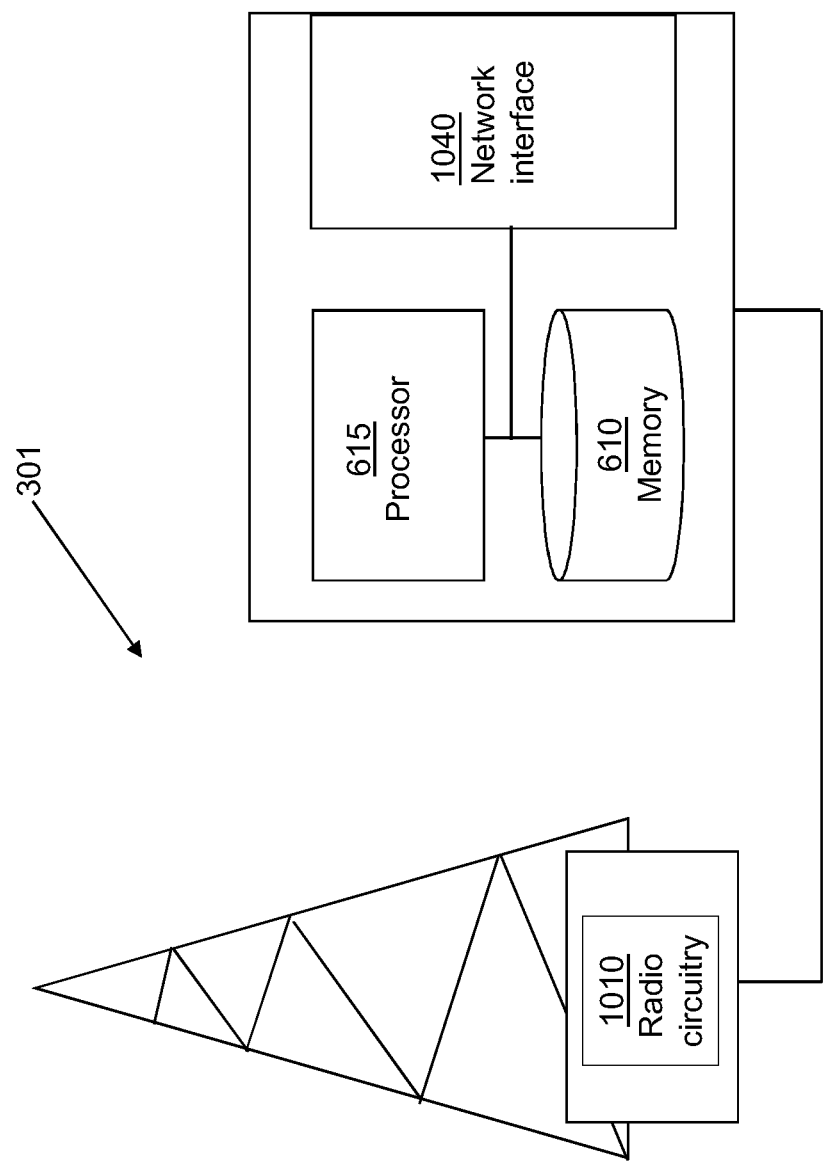
FIG. 10 is a schematic block diagram illustrating embodiments of a network node.

As shown in FIG. 10, the example network node 301 comprises the processor 615, the memory 610, radio circuitry 1010, network interface 1040 and at least one antenna. The processor 615 may comprise RF circuitry and baseband processing circuitry (not shown). In particular embodiments, some or all of the functionality described above as being provided by a mobile base station, a base station controller, a relay node, a NodeB, an enhanced NodeB, and/or any other type of mobile communications node may be provided by the processor 615 executing instructions stored on a computer-readable medium, such as the memory 610 shown in FIG. 10. Alternative embodiments of the network node 301 may comprise additional components responsible for providing additional functionality, comprising any of the functionality identified above and/or any functionality necessary to support the solution described above.

The embodiments herein relates to a mechanism allowing the network node 301 to dynamically indicate to the wireless device 305 that a multi-TTI message is adjusted, interrupted, or prematurely terminated. This allows the network node 301 to prioritize other traffic without having to wait for the previous message to complete, which may substantially reduce the latency in the communications network 300. By introducing such a mechanism, the benefit of the multi-TTI scheduling message in terms of reduced signalling overhead can be achieved, without imposing any additional scheduling constraints, since the network node has the flexibility to "change its mind".

Scheduling message involving multiple TTIs, i.e. subframes, have the advantage of reduced scheduling message signaling overhead, but comes at the cost of reduced dynamic scheduling flexibility. The embodiments herein provide a means to alleviate such scheduling restrictions.

The embodiments herein alleviate the network node scheduling restrictions imposed by multi-TTI scheduling messages. The embodiments herein allow for the reduced overhead benefits of multi-TTI scheduling, without degrading network node data traffic adaptability.

The embodiments herein are not limited to the features and advantages mentioned above.

Note that although terminology from 3GPP LTE has been used in this disclosure to exemplify the embodiments herein, this should not be seen as a limitation to only the aforementioned communications network. Other communications networks, comprising WCDMA, Worldwide Interoperability for Microwave Access (WiMax), Ultra Mobile Broadband (UMB) and GSM, may also benefit from exploiting the ideas covered within this disclosure.

Also note that terminology such as eNodeB and UE should be considering non-limiting and does in particular not imply a certain hierarchical relation between the two; in general "eNodeB" could be considered as device 1 and "UE" device 2, and these two devices communicate with each other over some radio channel, e.g. the radio channel 310. Herein, the focus is on wireless transmissions in the downlink, but the embodiments herein are equally applicable in the uplink.

In the above, the embodiments herein are illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

The embodiments herein are not limited to the above described embodiments. Various alternatives, modifications and equivalents may be used. Therefore, the above embodiments should not be taken as limiting the scope of the embodiments herein.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to" or "adapted to".

It should also be emphasised that the steps of the methods defined in the appended claims may, without departing from the embodiments herein, be performed in another order than the order in which they appear.

The invention claimed is:

1. A method, in a network node, for handling scheduling of a wireless device in a communications network, wherein the network node is configured to communicate wirelessly with the wireless device over a radio channel, the method comprising:
   determining that an ongoing data transmission or an ongoing data reception corresponding to a multi-Transmission Time Interval (TTI) scheduling message previously transmitted to the wireless device should be at least one of adjusted, interrupted, and terminated, said multi-TTI scheduling message scheduling the wireless device to perform data transmission or data reception during multiple TTIs; and
   transmitting, to the wireless device, information indicating that the ongoing data transmission or the ongoing data reception corresponding to a previously transmitted multi-TTI scheduling message should be at least one of adjusted, interrupted, and terminated as determined.

2. The method according to claim 1, wherein the transmitted information comprises a new multi-TTI scheduling message or a single-TTI scheduling message.

3. The method according to claim 1, further comprising transmitting a new multi-TTI scheduling message to the wireless device when the data transmission or the data reception corresponding to the previously transmitted multi-TTI scheduling message should be at least one of adjusted, interrupted, and terminated, wherein the new multi-TTI scheduling message is to override or extend or reduce the previously transmitted multi-TTI scheduling message.

4. The method according to claim 1, wherein:
   the multi-TTI scheduling message comprises a multi-TTI scheduling assignment for a downlink direction or a multi-TTI scheduling grant for an uplink direction; and
   the multi-TTI scheduling message comprises the previously transmitted multi-TTI scheduling message or a new multi-TTI scheduling message.

5. The method according to claim 1, wherein the transmitted information is based on predefined rules of a Downlink scheduling Control Information (DCI) interpretation.

6. The method according to claim 1, further comprising:
   transmitting new data to the wireless device, said new data being at least one of adjusted, interrupted, and terminated; or
   receiving new data from the wireless device, said new data being at least one of adjusted, interrupted, and terminated.

7. The method according to claim 1, wherein at least part of the data transmission or data reception are comprised in flexible subframes, and wherein the flexible subframes are flexible with regards to being an uplink subframe or a downlink subframe and based on instantaneous traffic situations at the network node.

8. The method according to claim 7, wherein the previously transmitted multi-TTI scheduling message is overridden by a reconfiguration or reallocation of an uplink state or a downlink state of the flexible subframes.

9. The method according to claim 1, wherein the wireless device comprises a user equipment and the network node comprises a base station.

10. The method according to claim 1, wherein the communications network comprises a Time-Division Duplexing (TDD) network or a Frequency-Division Duplexing (FDD) network.

11. A method, in a wireless device, for handling scheduling of the wireless device in a communications network, wherein the wireless device is configured to communicate wirelessly with the network node over a radio channel, the method comprising:
  receiving, from the network node, information indicating that an ongoing data transmission or an ongoing data reception corresponding to a previously received multi-Transmission Time Interval (TTI) scheduling message should be at least one of adjusted, interrupted, and terminated, said multi-TTI scheduling message scheduling the wireless device to perform data transmission or data reception during multiple TTIs; and
  handling the information indicating that the ongoing data transmission or the ongoing data reception corresponding to the previously received multi-TTI scheduling message should be at least one of adjusted, interrupted, and terminated.

12. The method according to claim 11, wherein the handling the information further comprises at least one of:
  adjusting the data transmission or the data reception;
  interrupting the data transmission or the data reception; and
  terminating the data transmission or the data reception.

13. The method according to claim 12, further comprising determining that a buffer of the wireless device is empty, wherein the data transmission or the data reception is interrupted or padded when the buffer is empty.

14. The method according to claim 11, further comprising receiving a new multi-TTI scheduling message or a single-TTI scheduling message to override or extend or reduce the previously received multi-TTI scheduling message.

15. The method according to claim 11, further comprising:
  receiving new data from the network node, the new data being at least one of adjusted, interrupted, and terminated; or
  transmitting new data to the network node, the new data being at least one of adjusted, interrupted, and terminated.

16. The method according to claim 11, wherein at least part of the data transmission or the data reception are comprised in flexible subframes, and wherein the flexible subframes are flexible with regards to being an uplink subframe or a downlink subframe and based on instantaneous traffic situations at the network node.

17. The method according to claim 11, wherein the multi-TTI scheduling message comprises a multi-TTI scheduling assignment or a multi-TTI scheduling grant, and wherein the multi-TTI scheduling message comprises the previously transmitted multi-TTI scheduling message or a new multi-TTI scheduling message.

18. The method according to claim 11, wherein the wireless device comprises a user equipment and the network node comprises a base station.

19. The method according to claim 11, wherein the communications network comprises a Time-Division Duplexing (TDD) network or a Frequency-Division Duplexing (FDD) network.

20. A network node for handling scheduling of a wireless device in a communications network, wherein the network node is configured to communicate wirelessly with the wireless device over a radio channel, the network node comprising:
  a determining circuit configured to determine that an ongoing data transmission or an ongoing data reception corresponding to a multi-Transmission Time Interval (TTI) scheduling message previously transmitted to the wireless device should be at least one of adjusted, interrupted, and terminated, said multi-TTI scheduling message scheduling the wireless device to perform data transmission or data reception during multiple TTIs; and
  a transmitter configured to transmit, to the wireless device, information indicating that the ongoing data transmission or the ongoing data reception corresponding to the previously transmitted multi-TTI scheduling message should be at least one of adjusted, interrupted, and terminated as determined.

21. The network node according to claim 20, wherein the transmitted information comprises a new multi-TTI scheduling message or a single-TTI scheduling message.

22. The network node according to claim 20, wherein the transmitter is further configured to transmit a new multi-TTI scheduling message to the wireless device when the data transmission or the data reception corresponding to the previously transmitted multi-TTI scheduling message should be at least one of adjusted, interrupted, and terminated, wherein the new multi-TTI scheduling message is to override or extend or reduce the previously transmitted multi-TTI scheduling message.

23. The network node according to claim 20, wherein the multi-TTI scheduling message comprises a multi-TTI scheduling assignment for a downlink direction or a multi-TTI scheduling grant for an uplink direction, and wherein the multi-TTI scheduling message comprises the previously transmitted multi-TTI scheduling message or a new multi-TTI scheduling message.

24. The network node according to claim 20, wherein the transmitted information is based on predefined rules of a Downlink scheduling Control Information (DCI) interpretation.

25. The network node according to claim 20,
  wherein the transmitter is further configured to transmit new data to the wireless device, the new data comprising at least one of adjusted, interrupted, and terminated; and
  wherein the network node further comprises a receiver configured to receive new data from the wireless device, the new data comprising at least one of adjusted, interrupted, and terminated.

26. The network node according to claim 20, wherein at least part of the data transmission or data reception are comprised in flexible subframes, and wherein the flexible subframes are flexible with regards to being an uplink subframe or a downlink subframe and based on instantaneous traffic situations at the network node.

27. The network node according to claim 26, wherein the previously transmitted multi-TTI scheduling message is overridden by a reconfiguration or a reallocation of an uplink state or a downlink state of the flexible subframes.

28. The network node according to claim 20, wherein the wireless device comprises a user equipment and the network node comprises a base station.

29. The network node according to claim 20, wherein the communications network comprises a Time-Division Duplexing (TDD) network or a Frequency-Division Duplexing (FDD) network.

30. A wireless device for handling scheduling of the wireless device in a communications network, wherein the wireless device is configured to communicate wirelessly with the network node over a radio channel, the wireless device comprising:
  a receiver configured to receive, from the network node, information indicating that an ongoing data transmission or an ongoing data reception corresponding to a previously received multi-Transmission Time Interval (TTI) scheduling message should be at least one of adjusted, interrupted, and terminated, said multi-TTI scheduling message scheduling the wireless device to perform data transmission or data reception during multiple TTIs; and a handling circuit configured to handle the information indicating that the ongoing data transmission or the ongoing data reception corresponding to the previously received multi-TTI scheduling message should be at least one of adjusted, interrupted, and terminated.

31. The wireless device according to claim 30, wherein the handling circuit is further configured to handle the information by implementing at least one of:

adjusting the data transmission or data reception;
interrupting the data transmission or data reception; and
terminating the data transmission or data reception.

32. The wireless device according to claim 31, further comprising a processor configured to determine that a buffer of the wireless device is empty, wherein the handling circuit is further configured to interrupt or pad the data transmission or the data reception when the buffer is empty.

33. The wireless device according to claim 30, wherein the receiver is further configured to receive a new multi-TTI scheduling message or a single-TTI scheduling message to override or extend or reduce the previously received multi-TTI scheduling message.

34. The wireless device according to claim 30, wherein the receiver is further configured to receive new data from the network node, the new data comprising at least one of adjusted, interrupted, and terminated; and wherein the wireless device further comprises a transmitter configured to transmit new data to the network node, the new data comprising at least one of adjusted, interrupted, and terminated.

35. The wireless device according to claim 30, wherein at least part of the data transmission or the data reception are in flexible subframes, and wherein the flexible subframes are flexible with regards to being an uplink subframe or a downlink subframe and based on instantaneous traffic situations at the network node.

36. The wireless device according to claim 30, wherein the multi-TTI scheduling message comprises a multi-TTI scheduling assignment or a multi-TTI scheduling grant, and wherein the multi-TTI scheduling message comprises the previously transmitted multi-TTI scheduling message or a new multi-TTI scheduling message.

37. The wireless device according to claim 30, wherein the wireless device comprises a user equipment and the network node comprises a base station.

38. The wireless device according to claim 30, wherein the communications network comprises a Time-Division Duplexing (TDD) network or a Frequency-Division Duplexing (FDD) network.

* * * * *